United States Patent [19]

Baldwin et al.

[11] Patent Number: 5,402,968
[45] Date of Patent: Apr. 4, 1995

[54] COLLAPSIBLE FUEL TANK SYSTEM

[75] Inventors: Donald D. Baldwin, Camden, Ark.; Randall V. Guest; Randall W. Nish, both of Provo, Utah; Robert G. Pearce, Lincoln, Nebr.

[73] Assignees: Brunswick Corp., Lake Forest, Ill.; Alcoa Composites, Inc., Alcoa Center, Pa.

[21] Appl. No.: 12,361

[22] Filed: Feb. 2, 1993

[51] Int. Cl.⁶ .............................................. B64D 37/02
[52] U.S. Cl. ................... 244/135 R; 220/4.15; 220/4.16; 220/684; 220/693
[58] Field of Search ............... 244/135 R, 120, 135 B; 220/4.15, 4.16, 4.17, 4.12, 692, 693, 682, 683, 4.07, 4.08, 4.09, 4.33, 359, 612, 613, 684, 693

[56] References Cited

U.S. PATENT DOCUMENTS

| | | | |
|---|---|---|---|
| 2,541,371 | 2/1951 | Kops | 220/4.15 |
| 2,829,793 | 4/1958 | Baumann | 220/4.15 |
| 2,832,503 | 4/1958 | Baumann | 220/4.15 |
| 2,836,117 | 5/1958 | Lankford | 220/4.15 |
| 2,916,787 | 12/1959 | Samiran | 244/135 R |
| 2,947,440 | 8/1960 | Slota | 220/4.15 |
| 2,955,787 | 10/1960 | Ray et al. | 244/135 R |
| 3,147,941 | 9/1964 | Hawthorne | 244/135 R |
| 3,469,730 | 9/1969 | Neff et al. | 220/4.15 |
| 4,108,328 | 8/1978 | Page | 220/4.15 |
| 4,669,506 | 6/1987 | Ramsey, Jr. | 138/89 |
| 4,790,350 | 12/1988 | Arnold | |
| 4,932,609 | 6/1990 | Secchiaroli et al. | 244/135 R |
| 5,054,635 | 10/1991 | Kolom | 244/135 R |
| 5,205,427 | 4/1993 | Crago et al. | 220/4.16 |

FOREIGN PATENT DOCUMENTS

| | | | |
|---|---|---|---|
| 483588 | 5/1952 | Canada . | |
| 544816 | 8/1957 | Canada | 220/4.15 |
| 786197 | 11/1957 | United Kingdom . | |

Primary Examiner—Galen L. Barefoot
Attorney, Agent, or Firm—Wood, Phillips, VanSanten, Hoffman & Ertel

[57] ABSTRACT

A collapsible fuel tank system for use on aircraft and the like includes a plurality of nestable shell sections which, when assembled in proper edgewise orientation, form a shell for the fuel tank. A nose cone and a number of shell-reinforcing bulkheads are axially spaced within the fuel tank and have a ring-and-groove construction for facilitating manual assembly of a fuel tank. A preassembled fuel management system includes an elongated flexible liner encapsulating the bulkheads and having snap connections for quick attachment to the shell interior. All of the components of a plurality of fuel tanks are housed in a single container for shipping and handling purposes.

35 Claims, 10 Drawing Sheets

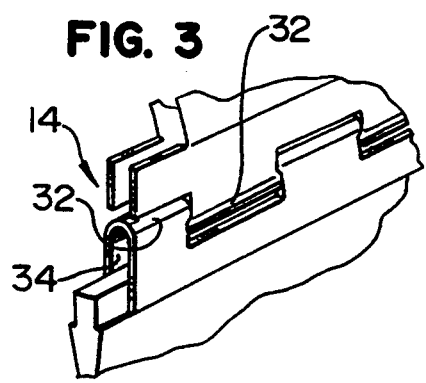
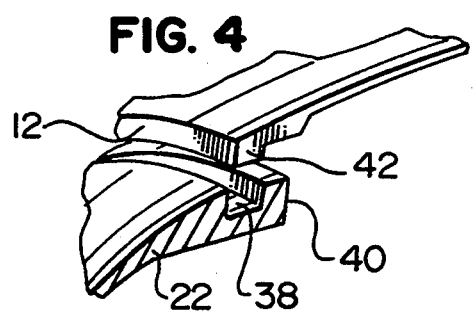
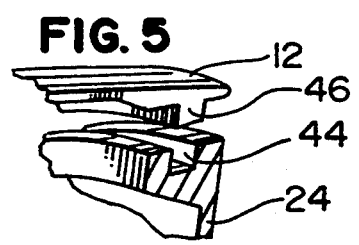
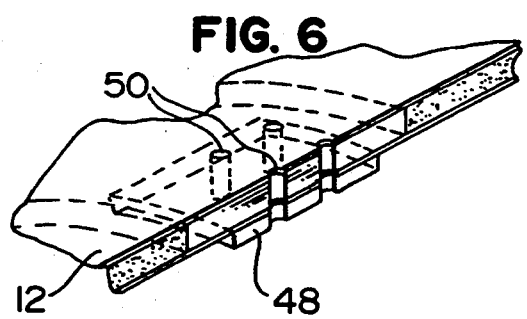

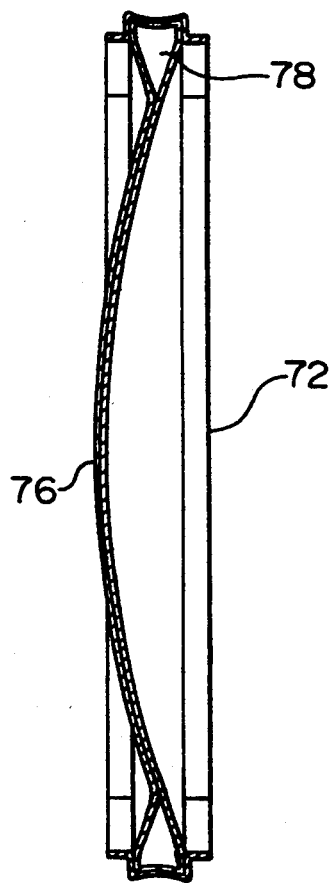
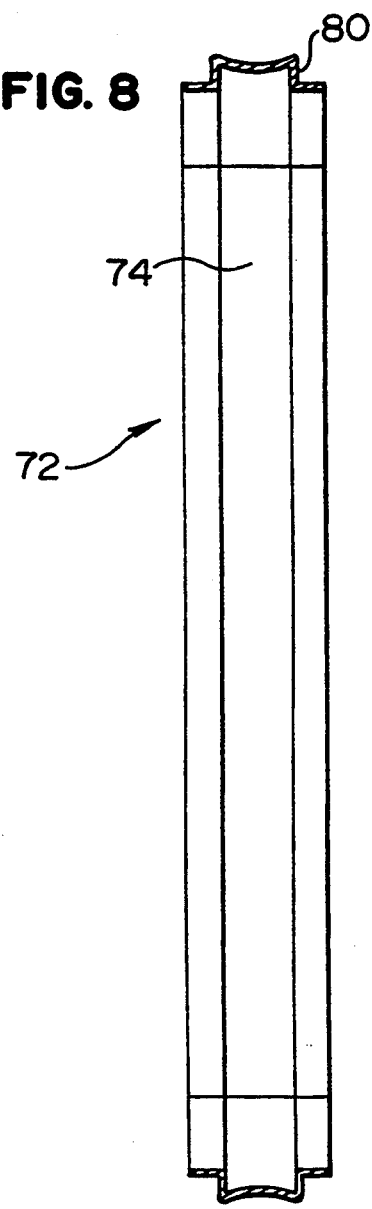
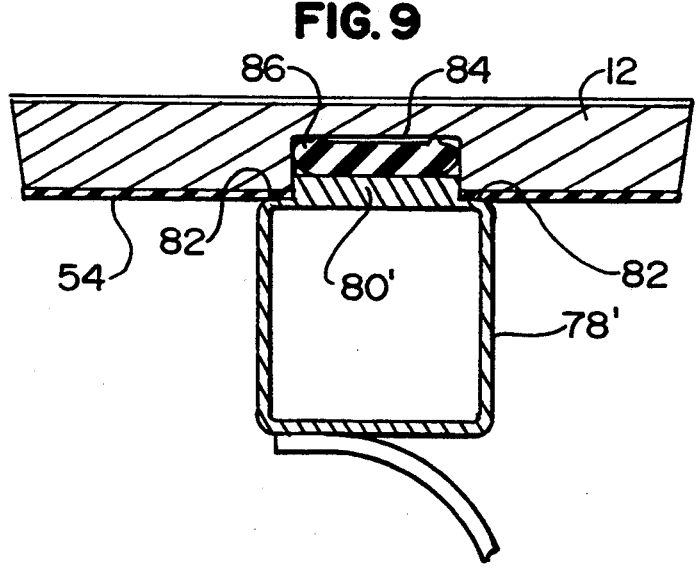

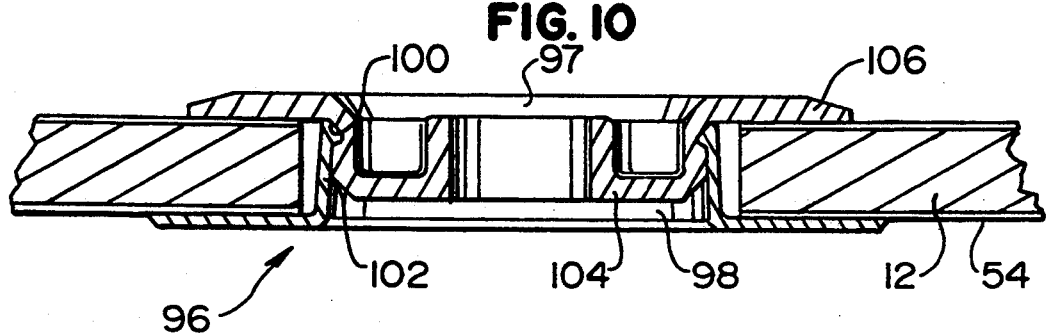
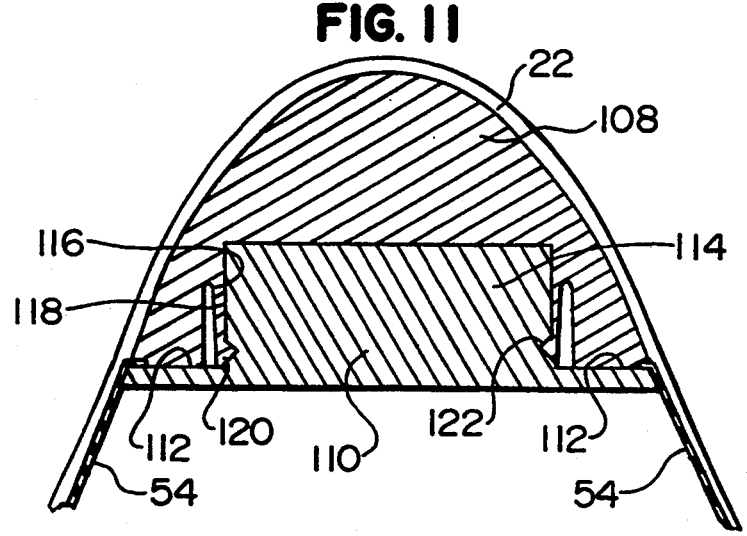
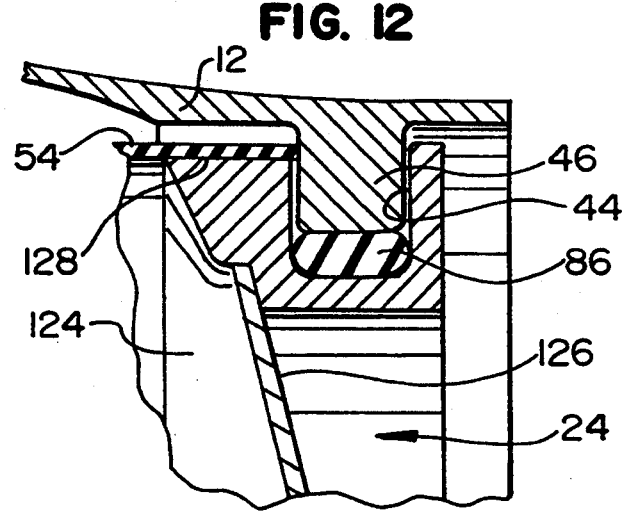

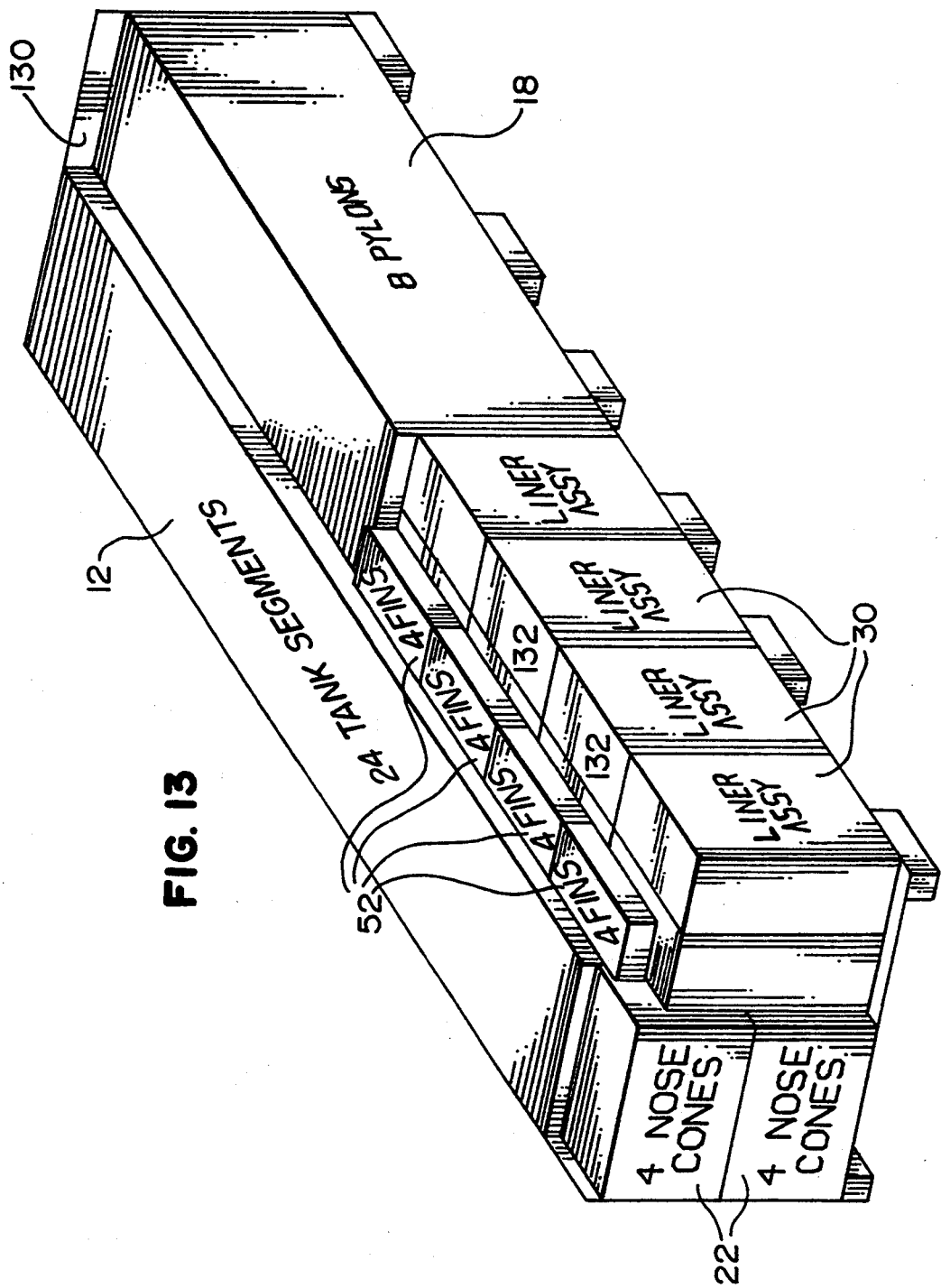

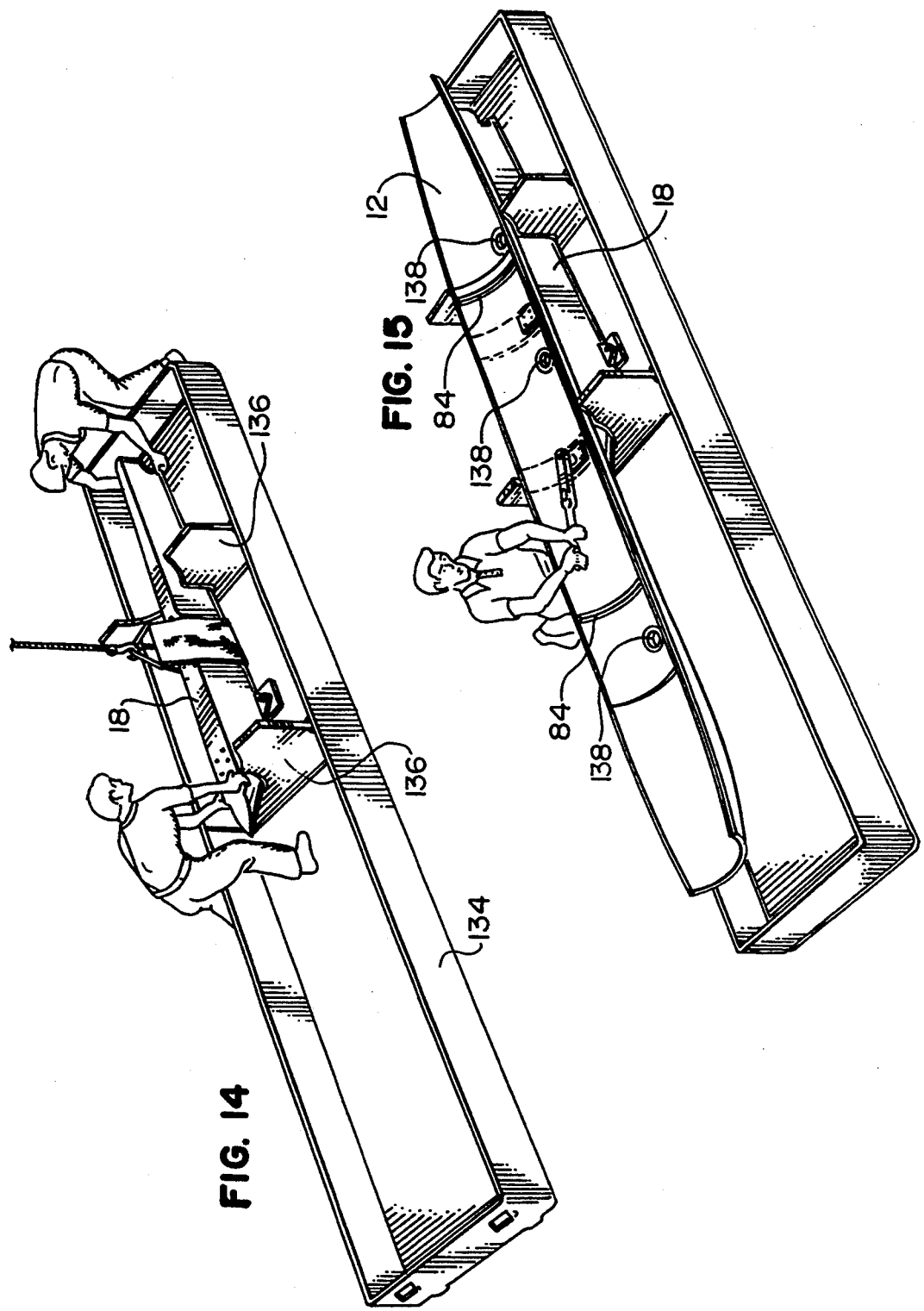

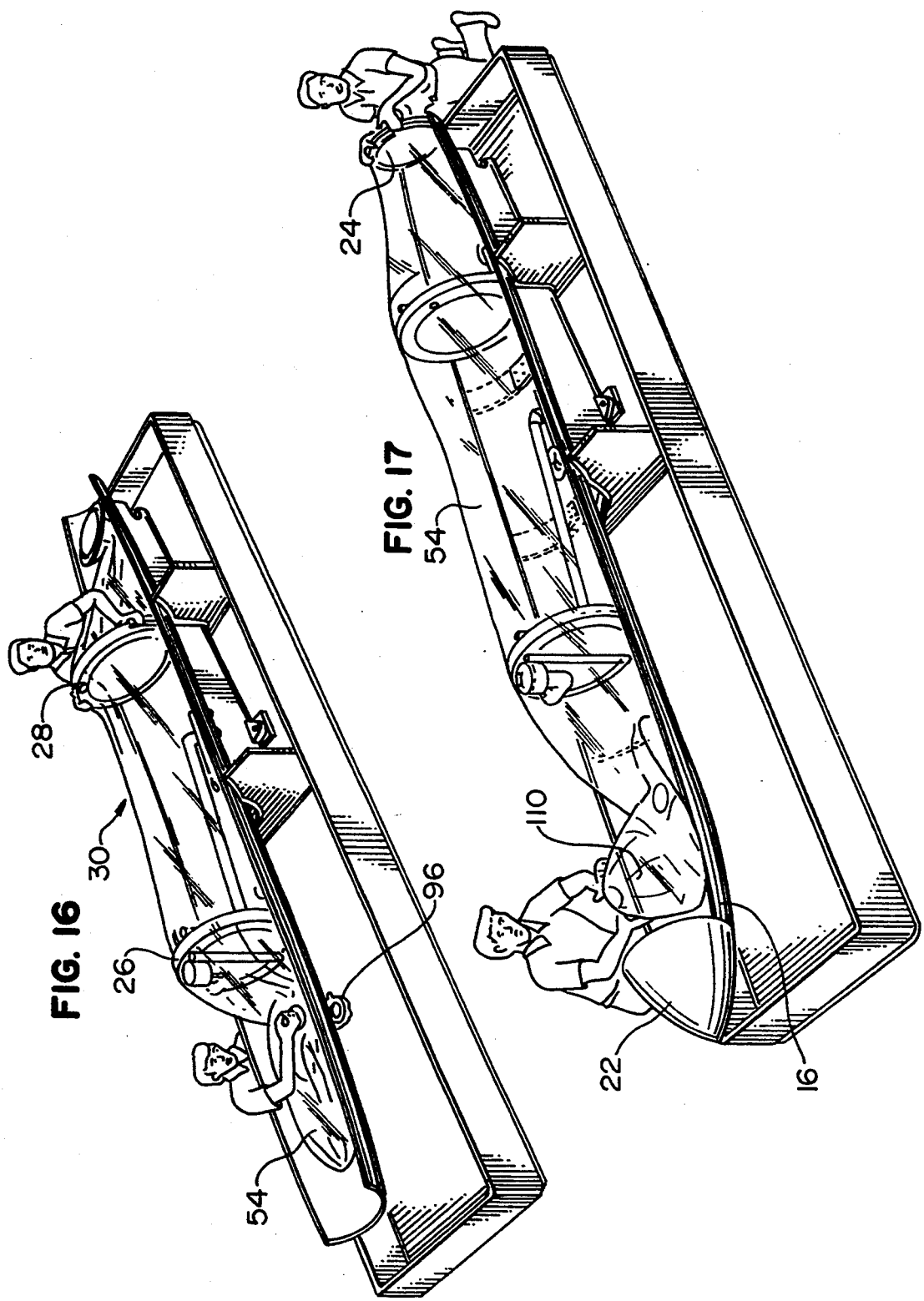

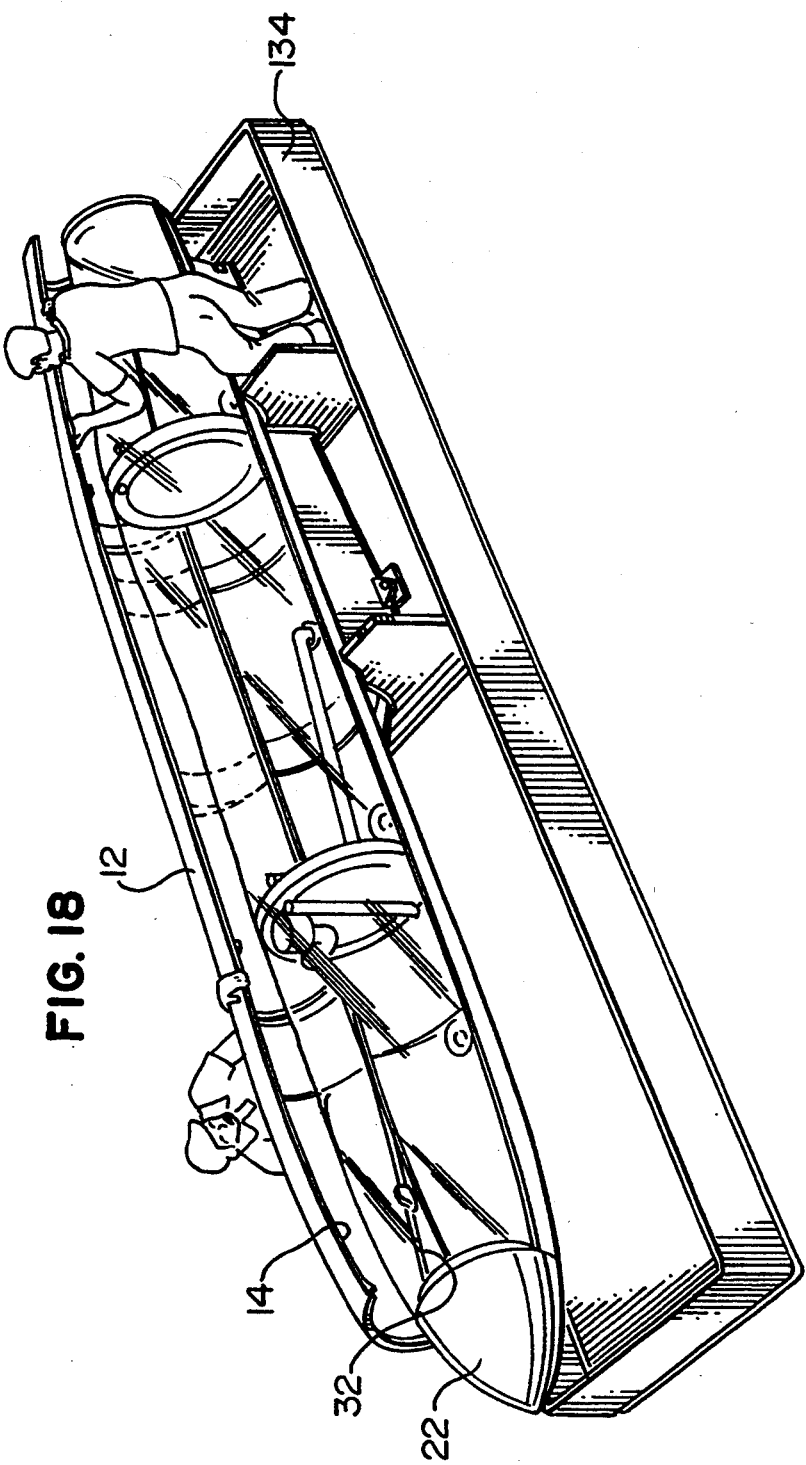

COLLAPSIBLE FUEL TANK SYSTEM

FIELD OF THE INVENTION

This invention generally relates to fuel tanks for aircraft and the like, and, particularly, to an externally mounted collapsible fuel tank system wherein the tanks can be compactly stored and readily field assembled.

BACKGROUND OF THE INVENTION

Some modern aircraft have fuel supply systems which include externally mounted fuel tanks that may be dropped in-flight when empty in order to reduce the weight and drag of the aircraft and thereby extend its range. For instance, combat aircraft may include a plurality of fuel tanks in their propulsion system whereby each tank contains a given amount of fuel such that the total on-board fuel supply is sufficient to accomplish a given mission. As an example, one fuel tank may contain a sufficient amount of fuel to power the aircraft for approximately 100 miles down range. When that tank is empty, the fuel tank is physically discarded to reduce the weight and drag of the aircraft and thereby extend its combat range as fuel is supplied by one or more additional tanks.

One of the main problems with such fuel tanks is the amount of space or area required to maintain a sufficient inventory of discardable fuel tanks in a given environment. One example is where satellite bases are set up remote from a main military installation. Another example is on aircraft carriers which accommodate a considerable number of aircraft and which may be at sea for an extended period of time. A very large number of discardable fuel tanks must be maintained in inventory under such circumstances.

This invention is directed to solving the problems identified above and satisfying a need for an external fuel tank system wherein the tanks are readily field assembled from compact storage either on the ground, on aircraft carriers, or the like. The compact storage and rapid assembly features disclosed herein are improvements over existing structures and comply completely with current military specifications.

It is believed that each fuel tank can be easily assembled within one hour by a two-person work crew, without requiring the assembly personnel to have particularly refined mechanical skills. In the example of the invention disclosed herein, as many as eight fuel tanks can be assembled from a shipping/storage carton of tank components which requires no more transportation and storage space than that required for a single assembled fuel tank.

SUMMARY OF THE INVENTION

An object, therefore, of the invention is to provide a novel fuel tank system wherein the fuel tanks are readily field assembled and prepared for mounting directly onto appropriate aircraft.

The collapsible fuel tank system of the invention contemplates a plurality of nestable shell sections which, when assembled in proper edgewise orientation, form a shell for the fuel tank. Piano hinge joints are provided for securing the shell sections in an assembled condition. The joints extend along mating edges of adjacent sections and include full-length wires for engaging complementary interleaved lugs on the adjacent shell sections to secure the sections together in assembled condition.

As disclosed herein, the fuel tank is elongated, with an aerodynamic shape, and each shell section extends substantially the entire length of the tank. A conical nose cone section and longitudinally spaced shell-reinforcing bulkheads have a ring-and-groove construction for facilitating manual assembly of the fuel tank.

The system includes fuel management means housed within the fuel tank shell and including an elongated flexible liner for encapsulating fuel within the tank. In the preferred embodiment of the invention, the flexible liner is preassembled with a plurality of hollow bulkheads and fuel conveying conduits for transferring fuel between a number of fuel-receiving compartments defined within the tank. Specifically, forward and center bulkheads bonded to the liner interior have a peripheral annular conduit for transferring fuel between the top of one side of the bulkhead and the bottom of the opposite side of the bulkhead.

Snap fit connection means are provided for quickly attaching the liner to the fuel tank shell and the nose cone. Snap receptacles having hooked resilient fingers are secured to the shell sections, and complementary male plugs are bonded to the liner. Each plug has a groove for resiliently receiving hooks on the distal ends of the fingers to secure the liner to the shell. A conical snap receptacle is seated in the nose cone section and receives a plug bonded to the flexible liner for facilitating extending and securing of the liner ahead of the forward bulkhead.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is an enlarged broken-out perspective view illustrating a piano hinge connection between adjacent shell sections of the modular fuel tank system;

FIG. 4 is an enlarged broken-out perspective view illustrating the ring-and-groove construction of the nose cone of the modular fuel tank system according to the invention;

FIG. 5 is an enlarged broken-out perspective view illustrating the ring-and-groove construction of the aft bulkhead of the modular fuel tank system according to the invention;

FIG. 6 is an enlarged broken-out perspective view of the reinforcing plate for attachment to the mounting pylon;

FIG. 7 is a side elevational view illustrating the construction of the forward and center bulkheads;

FIG. 8 is a side elevational view similar to FIG. 7 with the bulkhead dome removed to facilitate the illustration;

FIG. 9 is a sectional view of an alternative bulkhead construction;

FIG. 10 is an sectional view illustrating a snap connector for attaching the flexible liner to the fuel tank shell;

FIG. 11 is a sectional view illustrating a snap connector for attaching the flexible liner to the nose cone;

FIG. 12 is a sectional view illustrating the attachment of the flexible liner to the aft bulkhead;

FIG. 13 is a schematic illustration of the modular fuel tank system of the present invention, showing the components of eight modular fuel tanks housed in a single container, with only the base of the container shown; and FIGS. 14–18 illustrate the manner in which two workmen would use the container lid for assembling a fuel tank.

DETAILED DESCRIPTION OF THE PREFERRED EMBODIMENTS

Figure 1:
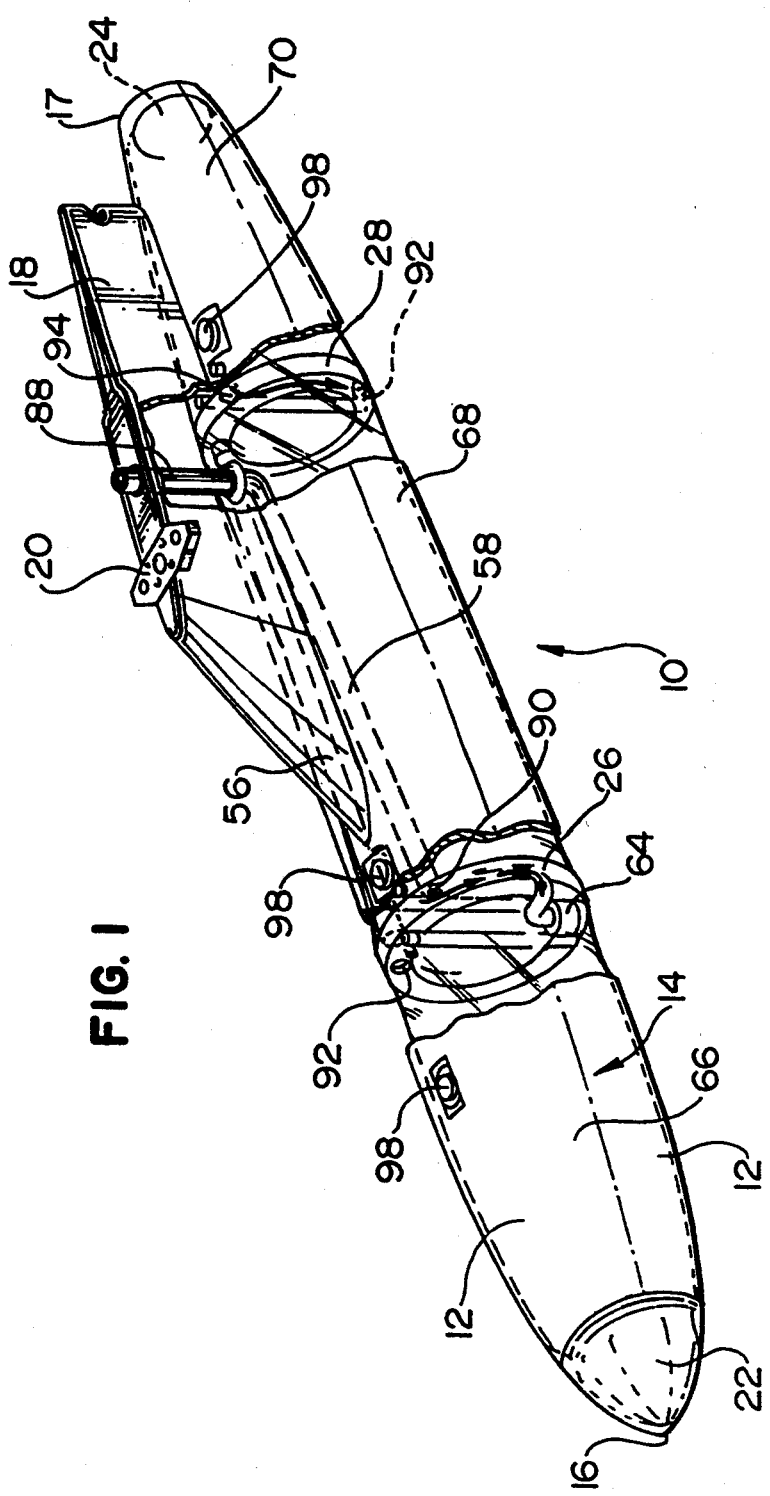
FIG. 1 is a perspective view of a modular fuel tank fabricated according to the concepts of the invention.

Referring to the drawings in greater detail, and first to FIG. 1, the external fuel tank system of the invention contemplates a fuel tank, generally designated 10, for use on aircraft and the like. The invention contemplates that fuel tank 10 be fabricated of a plurality of nestable shell sections 12 which, when assembled in proper edgewise orientation as shown in FIG. 1, form a shell for the fuel tank.

Discardable fuel tanks of the character described herein often are mounted externally on an aircraft and, consequently, are aerodynamically shaped as shown by the elongated, circular "torpedo" shape shown in FIG. 1. The illustrated embodiment of the invention includes three shell sections 12 which extend substantially the entire length of the fuel tank. The shell sections are concave in configuration (i.e., in reference to their external surfaces), whereby the shell sections are nestable in a convex stack thereof. Mating edges of adjacent shell sections 12 are coupled by joint means 14, and opposite ends of the shell sections are coupled with a conical shell section at a forward end 16 of the fuel tank 10 and a flat shell section at the rear or aft end 17 of the fuel tank. A mounting pylon 18 is bolted to the top section of the fuel tank and has a release swaybrace bracket 20 for releasable attachment to the underside of an airplane wing, for instance.

Figure 2:
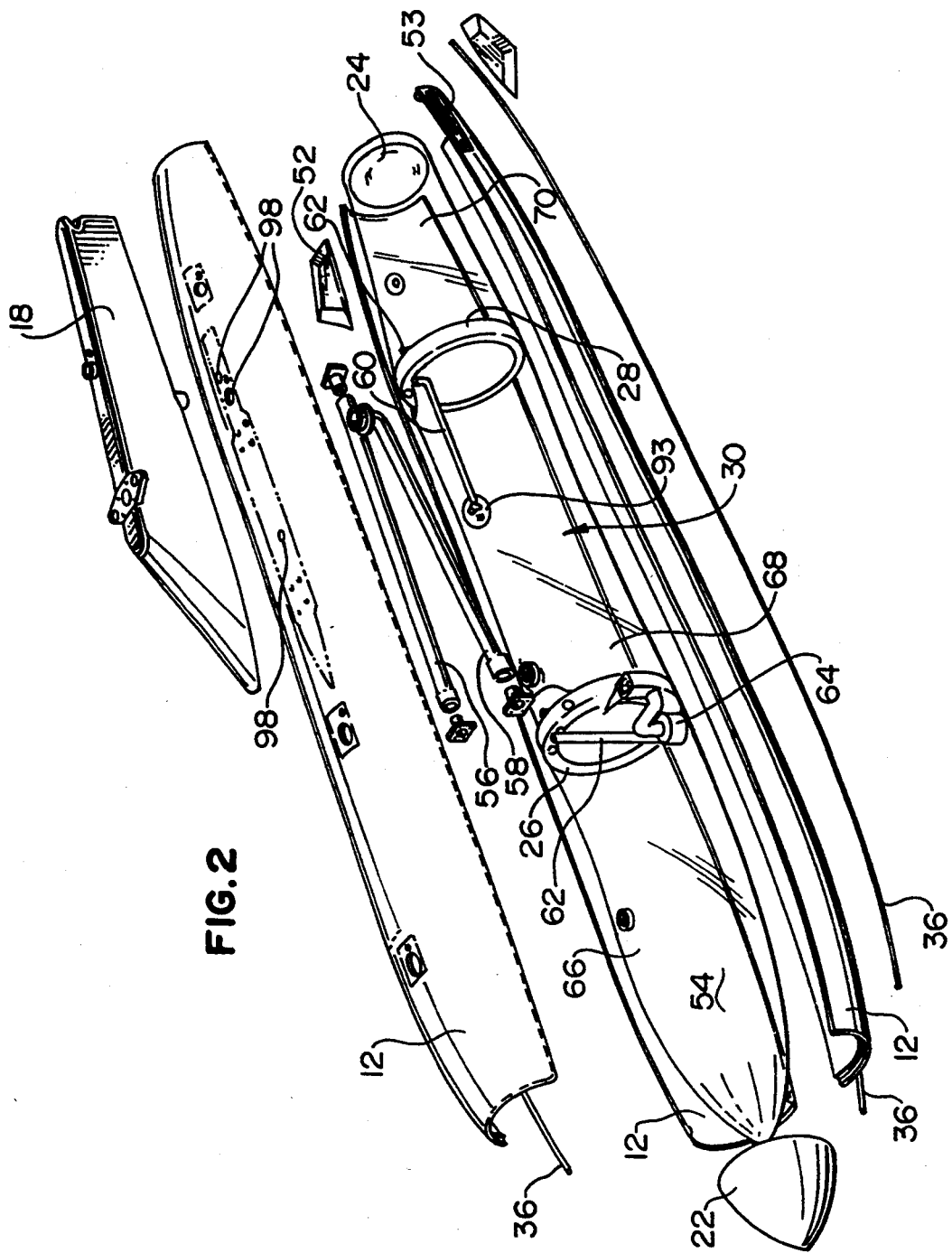
FIG. 2 is an exploded perspective view of the components of the fuel tank of FIG. 1.

FIG. 2 shows the components of fuel tank 10 described in relation to FIG. 1 in an exploded condition to facilitate the illustration. In this view, it can be seen that fuel tank 10 consists of three longitudinal shell sections 12, a nose cone 22, an aft bulkhead 24, and forward and center bulkheads 26 and 28, respectively. Additionally, internal fuel management means, generally designated 30, are housed within the fuel tank shell and extend substantially between nose cone 22 and aft bulkhead 24.

Figure 3A:
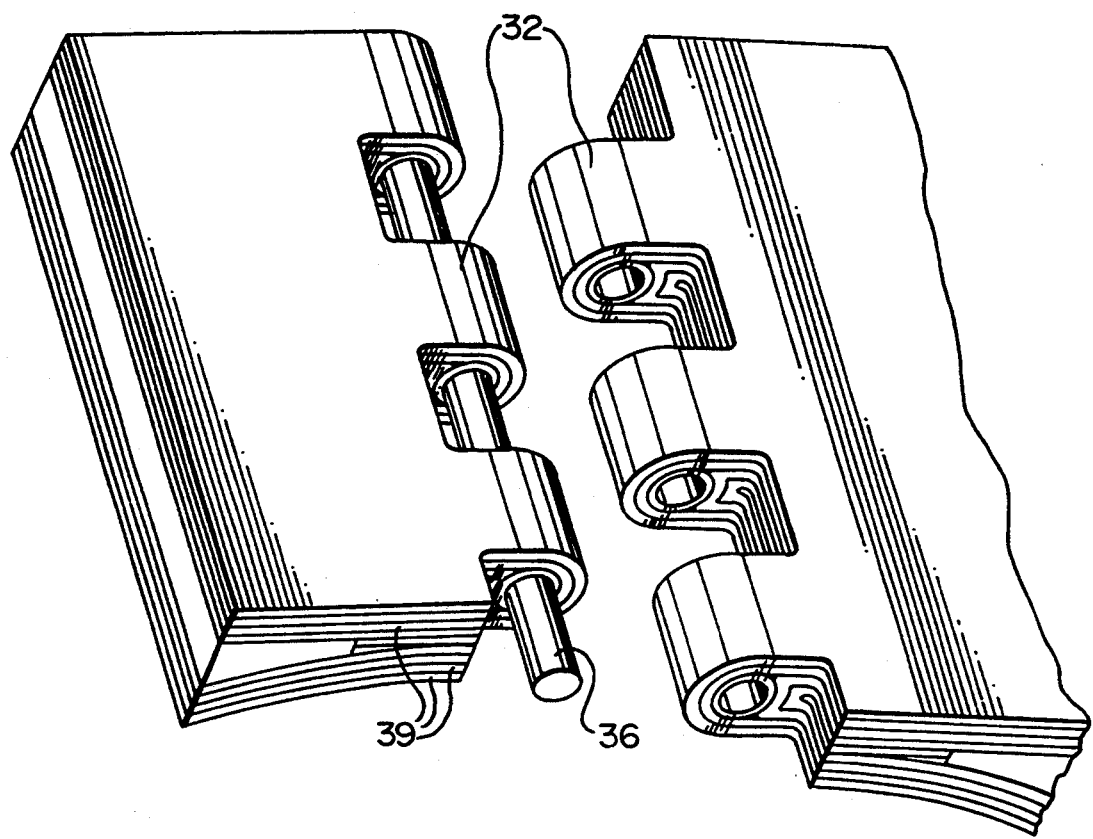
FIG. 3A is similar to FIG. 3 and illustrates a piano hinge connection having an all composite construction.

Referring to FIGS. 3–6, the manner in which fuel tanks 10 are assembled can be readily understood. Specifically, joint means 14 are provided on the mating longitudinal edges of adjacent shell sections 12 and comprise a series of spaced apart lugs 32. Each of lugs 32 define a substantially U-shaped passageway therethrough and along a respective section edge, whereby a pair of juxtaposed sections 12 have lugs 32 interleaved in an alternating arrangement to define a closed longitudinal channel 34 between the sections. As shown in FIG. 3, lugs 32 are formed integrally with U-shaped sleeves 35 which are bonded to a reduced thickness peripheral edge 37 of the adjacent shell sections 12. In the alternative embodiment illustrated in FIG. 3A, joint means 14 have an all composite construction wherein the lugs 32 are formed integrally with the shell sections 12 and comprise a multiplicity of fiber reinforced layers 39. The lugs have an axial opening for defining a cylindrical channel 34' when the lugs are interleaved.

A full-length wire 36 (FIG. 2) is received in channel 34 (or the channel 34', as in the embodiment illustrated in FIG. 3A) to form a "piano hinge" type connection between the adjacent shell sections. The smooth external contour of sections 12 define a continuous curvature such that wires 36 are able to slide easily the entire length of the piano hinge joint. Preferably, wire 36 is slightly greater than the length of shell sections 12, such that excess wire length extends aft of the joints to allow access by a tool and permit extraction of the wire. When fully assembled, the three interlocked sections 12 define a stable, elongated structural shell in which the adjacent sections are constrained from relative movement.

Nose cone 22 and aft bulkhead 24 are advantageously secured to the fuel tank shell by means of a ring-and-groove construction, illustrated in FIGS. 4 and 5. Nose cone 22 has an annular groove 38 formed about the periphery and near the trailing edge 40 thereof, and each shell section 12 has a radially inwardly directed arcuate flange 42 at the forwardmost edge of the section. As shown in FIG. 4, trailing edge portion 40 of nose cone 22 has an increased thickness whereby the structural integrity of the nose cone is maintained despite the cut-away groove 38. When three shell sections 12 are assembled into the rigid, torpedo-shaped structure discussed above, flanges 42 are tangentially mated to define a locking ring about the shell interior for engaging the groove 38 on nose cone 22 and securely joining the fuel tank components.

Similar to nose cone 22, aft bulkhead 24 has a peripheral annular groove 44 (FIG. 5). Each section 12 also has a radially inwardly directed arcuate flange 46 at the rearwardmost edge thereof to define a rear locking ring about the shell interior when three shell sections 12 are assembled. That is, the rear locking ring is received in annular groove 44 for locking aft bulkhead 24 to the fuel tank shell. The peripheral edge portion of aft bulkhead 24 has an increased thickness for reinforcing the ring-and-groove connection thereat.

A generally rectangular reinforcing plate 48 (FIG. 6) is mounted to the interior surface of the top shell section 12 and has a plurality of fastener-receiving openings 50 for mounting pylon 18 to the fuel tank shell. The thickness and material of which reinforcing plate 48 is composed appropriately are selected to minimize the effect on the overall weight of the fuel tank while adequately distributing loads from the point of attachment to an aircraft over the fuel tank shell. Aerodynamic fins 52 (FIG. 2) are attached to the tank shell by quick attachment means such as connecting rails 53 and provide aerodynamic stability after jettisoning from a host aircraft.

Internal fuel management means 30 include a plurality of preassembled components for rapid installation in the field and has an elongated flexible liner or bladder 54 (FIG. 2) enclosing and protecting the fuel management components during storage and for sealing and encapsulating fuel within fuel tank 10. Referring back to FIGS. 1 and 2, internal fuel management means 30 include forward, center, and aft shell-reinforcing bulkheads 26 and 28 and 24, respectively, fuel conveying conduits 56 and 58, and a tube 60. Three fuel level probes 62 are mounted on bulkheads 26 and 28, and a shut-off valve 64 is connected to the forward side of forward bulkhead 26 for purposes to be discussed hereafter.

Forward bulkhead 26 and center bulkhead 28 are generally similar structures bonded about their peripheries to liner 54 by adhesive or other suitable means and partition the liner interior into three fuel-receiving compartments 66, 68 and 70. Each of bulkheads 26 and 28 (see FIGS. 7-9) is a two-piece assembly having a ring support 72 with an interior annular channel 74 for seating a generally circular concave bulkhead disk or dome 76. An annular passage 78 (FIG. 7) extends around the periphery of and is integral with the bulkhead dome 76 for transferring fuel around the bulkhead. Flexible liner 54 is bonded to an upstanding rim 80 (FIG. 8) on ring support 72, and the ring support is received in an annular groove formed in the interior of the fuel tank shell to lock bulkheads 26 and 28 in place during assembly of shell sections 12.

An alternative embodiment of bulkheads 26 and 28 is illustrated in FIG. 9 wherein an annular box-channel member 78' is attached to the periphery of a concave bulkhead dome 76'. Flexible liner 54 is bonded to the outer face 82 of box-channel member 78' and an upstanding rim 80' is received in a groove 84 in shell section 12.

An inflatable seal 86 is bonded to rim 80' and is received in groove 84, whereby once the rim is inserted into the groove, seal 86 can be inflated to take up clearance space which develops during pressurization of the fuel tank and to rigidify the bulkhead/shell connection. Seal 86 preferably is inflated with a quick curing organic polymer which will solidify through irreversible cross polymerization. Elimination of the clearance space also prevents chafing in the joints during tank vibration. The invention also envisions the use of inflatable seals 86 with ring supports 72 described above in connection with bulkheads 26 and 28.

The manner in which the above-discussed components of internal fuel management means 30 cooperate to provide for the filling of compartments 66, 68 and 70 with fuel will now be discussed with reference to FIG. 1. Fuel flows from an aircraft through a filler tube 88 which extends through mounting pylon 18 and communicates with fuel conveying conduit 58. Fuel enters the annular passage 78 on forward bulkhead 26 through an opening 90 and flows downwardly toward shut-off valve 64. Fuel flows across the shut-off valve and initially fills forward compartment 66. When the fuel level in the forward compartment reaches the height of an opening 92 in the forward side of bulkhead 26, fuel flows through conduit 56 toward center bulkhead 28.

Fuel enters annular passage 78 on center bulkhead 28 and flows downwardly toward an opening 92 which opens into aft fuel compartment 70. When the fuel level in the aft compartment reaches the height of an opening 94 communicating with passage 78, fuel flows into center compartment 68. When center compartment 68 fills, a high level pilot valve 93 at the end of tube 60 near the tope of the tank senses the tank full condition and closes shut-off valve 64. Air pressure moves fuel out of the tank in a reverse flow path of that described for filling the tank.

To facilitate assembly of fuel tank 10, flexible liner 54 includes snap connection means 96 shown in FIG. 10 for quickly securing the liner to the fuel tank interior. Snap connections are used for attaching fuel filler caps 98 to the top shell section 12 and are also used for related fuel, air and electrical connections 98 to the mounting pylon. As shown in FIG. 10, snap connection means 96 has a male plug 97 securely attached to a longitudinal shell section 12. A female receptacle 98 is bonded to flexible liner 54 and has an annular groove 100 for receiving upstanding resilient fingers 102 formed on receptacle 98. A cylindrical hub 104 on plug 97 extends through a complementary opening defined by the upstanding fingers 102 on receptacle 98 and includes an annular flange 106 for attachment to liner 54.

The manner in which liner 54 is attached to nose cone 22 is illustrated in FIG. 11 and includes a conical snap-fit receptacle 108 securely attached to the interior surface of nose cone section 22. A nose plug 110 has an annular rim 112 bonded to flexible liner 54 and a cylindrical hub 114 received in a complementary opening 116 in snap-fit receptacle 108. The snap-fit receptacle has resilient fingers 118 terminating in hooks 120 for engaging a groove 122 formed on hub 114. During assembly, nose plug 110 is readily engaged with snap fit receptacle 108 to secure liner 54 to nose cone 22.

FIG. 12 illustrates the connection of flexible liner 54 to aft bulkhead 24. Specifically, aft bulkhead 24 includes a ring support 124 and an attached bulkhead dome 126 for enclosing the aft fuel compartment 70. Ring support 124 has a cylindrical exterior surface 128 attached to flexible liner 54 by adhesive or other suitable means. Locking ring 46 discussed above is received in annular groove 44 to lock bulkhead 24 in place during assembly of shell sections 12. One of the seals 86 is engaged in groove 44 between the base of the groove and locking ring 46.

FIG. 13 shows a base 130 of a box-like container within which all of the components of a plurality of modular fuel tanks 10 (FIGS. 1 and 2) can be housed for shipping and handling purposes. Various of the components described in relation to FIGS. 1 and 2 are schematically illustrated, such as shell sections 12, nose cones 22, mounting pylons 18, preassembled fuel management means 30 and aerodynamic fins 52. Not shown in FIG. 13 are full-length wires 36, fuel conveying conduits 56 and 58, and bolts for attaching mounting pylons 18 to the fuel tank shells. The items not shown are placed on top of those illustrated in FIG. 13 and can be readily moved aside to provide access to all the items in the container 130 required for assembly of a single fuel tank 10. The illustrated components are advantageously located within shipping/storage container 130 as to be readily removed without unpacking or removing other items stored in the container.

Importantly, flexible liner 54 and related components of internal fuel management means 30 are age-sensitive materials which must be readily accessible for updating containers in long-term storage. That is, the liner assemblies are packaged in individually readily identifiable packages which are located near the top of container 130 and can be removed without requiring the removal of other tank components.

FIGS. 14-18 show somewhat schematically how modular fuel tanks 10 are individually assembled out of container base 130, as needed. The container includes a lid assembly fixture 134 positionable over base 130 and held thereon by appropriate fastening means. Lid assembly fixture 134 is removed and placed upside down on a support surface when it is desired to assemble a fuel tank out of the container. The lid includes a pair of spaced apart notched panels 136 which extend substantially vertically from its top surface when placed upside down. Initially, it can be seen in FIG. 14 that a mounting pylon 18 is lowered into position and received within the notched panels 136. The workmen then are free to lift additional components off of their respective stacks within container base 130 and begin assembling the fuel tank shell, as illustrated in FIGS. 15-18.

Specifically, FIG. 15 shows a workman assembling a shell section 12 to the underside of mounting pylon 18. This may be the top shell section as viewed in FIG. 1, including appropriate apertures 138 for receiving fuel plugs 98. The section is secured to the mounting pylon by conventional fastening means, such as bolts. Once the top shell section is secured to the mounting pylon as shown in FIG. 14, internal fuel management means 30 then is installed (FIGS. 16 and 17).

Specifically, forward bulkhead 26 is positioned with upstanding rim 80 received in arcuate groove 84 on the shell section. Similarly, center bulkhead 28 is positioned with upstanding rim 80 received in a groove 84. Snap connection means 96 as discussed above are installed to secure the flexible liner 54 to shell section 12.

FIG. 17 illustrates the next step in the assembly process wherein nose cone 22 is positioned at the forward end 16 of the fuel tank shell and aft bulkhead 24 is positioned at the rear end 17 of the fuel tank. As previously described, liner 54 is bonded to aft bulkhead 24, as well as forward bulkhead 26 and center bulkhead 28, prior to installation within the fuel tank. The preassembled nature of fuel management means 30 facilitates the installation thereof and reduces the time required for field assembly. Nose plug 110 then is snapped into engagement with receptacle 108 in nose cone 22 to fully extend flexible liner 54 and complete installation of fuel management means 30.

Following installation of the internal fuel management means, additional shell sections 12 are connected to the sub-assembly by joint means 14 to define a closed, elongated housing for the internal components of the described modular fuel tank system. That is, spaced apart lugs 32 on each of the mating longitudinal edges of adjacent shell sections are interleaved to define U-shaped channel 34. A full-length wire 36 then is inserted into the channel to connect the sections. When the adjacent shell sections 12 are interconnected, each is aligned with nose cone 22, and bulkheads 24, 26 and 28 such that the respective ring-and-groove construction is achieved.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A collapsible fuel tank system for use on aircraft and the like, comprising:
   a plurality of elongated shell sections which, when assembled in proper edgewise orientation, form a shell for a fuel tank, the shell sections each having a given thickness, and joint means extending along mating edges of adjacent shell sections for securing the shell sections in assembled condition; and
   a nose cone section for closing a forward end of the fuel tank shell, the nose cone section having a given thickness, the nose cone section and the elongated shell sections having ring-and-groove construction means for securing the nose cone to the fuel tank shell,
   the ring-and-groove construction means including an annular groove on one of said nose cone and said fuel tank shell, and a complementary flange on the other of said nose cone and Said fuel tank shell, whereby upon assembly of the shell sections the complementary flange is received in the annular groove to secure the nose cone to the fuel tank shell, and
   wherein edge portions of the shell sections and the nose cone section at said ring-and-groove construction means have integral increased thicknesses on the insides thereof and within which the groove and the flange are disposed.

2. The fuel tank system of claim 1 in which the nose cone has an outwardly opening annular groove.

3. The fuel tank system of claim 2 in which each shell section has an inwardly directed arcuate flange which, when said sections are tangentially mated in an assembled condition, define a locking ring on the shell interior for engaging the annular groove.

4. The fuel tank system of claim 1 in which the fuel tank system has a flat shell section for closing a rearmost end of the fuel tank shell, the flat shell section and the elongated shell sections having ring-and-groove construction means for securing the flat shell section to the fuel tank shell.

5. The fuel tank system of claim 4 in which the ring-and-groove construction means include an annular groove on one of said flat shell section and said fuel tank shell, and a complementary flange on the other of said flat shell section and said fuel tank shell, whereupon assembly of the shell sections the complementary flange is received in the annular groove to secure the flat shell section to the fuel tank shell.

6. The fuel tank system of claim 1, including a plurality of shell-reinforcing bulkheads longitudinally spaced within the fuel tank, the bulkheads and the elongated shell sections having ring-and-groove construction means for securing the bulkheads to the fuel tank shell.

7. A collapsible fuel tank system for use on aircraft and the like, comprising:
   a plurality of elongated shell sections which, when assembled in proper edgewise orientation, form a shell for a fuel tank, the shell sections each having a given thickness, and joint means for securing the shell sections in assembled condition;
   a plurality of bulkheads longitudinally spaced within the fuel tank for reinforcing the fuel tank shell, at least one of the bulkheads and the elongated shell sections having ring-and-groove means for securing the bulkhead to the fuel tank shell said at least one bulkhead having a given thickness; and
   wherein edge portions of the shell sections and said at least one bulkhead have increased thicknesses on the insides thereof and within which the ring-and-groove means are disposed.

8. The fuel tank system of claim 7, including seal means interposed between the bulkheads and the elongated shell sections.

9. The fuel tank system of claim 8 in which the seal means comprise an inflatable tube surrounding the bulkhead.

10. The fuel tank system of claim 9 in which the inflatable tube is adapted to receive a rapidly curing polymer.

11. The fuel tank system of claim 7 in which the bulkheads partition the fuel tank into a plurality of fuel-receiving compartments.

12. The fuel tank system of claim 11, including means to transfer fuel between said fuel-receiving compartments.

13. The fuel tank system of claim 12 in which at least one bulkheads comprise a generally circular plate having a peripheral conduit for conveying fuel around the bulkhead.

14. The fuel tank system of claim 13 in which the peripheral conduit has openings in communication with said fuel-receiving compartments.

15. The fuel tank system of claim 7 in which a bulkhead comprises an annular support ring secured to the fuel tank shell and mounting a bulkhead disk.

16. The fuel tank system of claim 15 in which the support ring has an inwardly opening annular channel for receiving the bulkhead disk.

17. The fuel tank system of claim 15 in which the bulkhead disk is concave.

18. The fuel tank system of claim 15 in which the bulkhead disk has a passage for transferring fuel between the top of one side of the disk and the bottom of the other side of the disk.

19. The fuel tank system of claim 18 in which the fuel conveying conduit is integral with the bulkhead disk.

20. The fuel tank system of claim 18 in which the fuel conveying conduit has a box-channel cross section.

21. The fuel tank system of claim 7, including a flexible liner encapsulating said bulkheads and sealing the interior of said fuel tank shell.

22. The fuel tank system of claim 21 in which the flexible liner is bonded to said bulkheads.

23. A fuel tank system for use on aircraft and the like, comprising:
a plurality of elongated shell sections which, when assembled in proper edgewise orientation, form a shell for a fuel tank, and joint means for securing the shell sections in assembled condition;
fuel management means housed within the fuel tank shell and including resilient connection means for snapping the fuel management means into engagement with the fuel tank shell;
an elongated flexible impermeable liner for encapsulating fuel within the fuel tank shell; and
a nose cone section for closing the forward end of the fuel tank shell, and including second resilient connection means for snapping the liner into engagement with the nose cone section, the second resilient connection means including a conical snap receptacle secured to the interior of said nose cone and a plug attached to the liner, said plug being snap fit into engagement with said receptacle to resiliently connect said liner and said nose cone.

24. The fuel tank system of claim 23, including first resilient connection means for snapping the liner into engagement with the shell sections.

25. The fuel tank system of claim 24 in which the first resilient connection means include a snap receptacle secured to one of said liner and said shell sections, and a plug secured to the other of said liner and said shell sections, said plug being snap fit into engagement with said receptacle to resiliently connect said liner and said shell sections.

26. The fuel tank system of claim 25 in which the snap receptacle defines an opening surrounded by a plurality of resilient fingers, said plug having a complementary hub portion received in said opening and including a groove for snap engagement with said resilient fingers.

27. The fuel tank system of claim 26 in which the plug is bonded to the liner.

28. The fuel tank system of claim 23 in which the snap receptacle defines an opening surrounded by a plurality of resilient fingers, said plug having a complementary hub portion received in said opening and including a groove for snap engagement with said resilient fingers.

29. The fuel tank system of claim 23 in which the liner has a plurality of openings for communicating with corresponding openings in said fuel tank shell, said resilient connection means including a snap receptacle secured to one of said liner and said shell section openings, and a plug secured to the other of said liner and said shell section openings, said plug being snap fit into engagement with said receptacle to resiliently connect said liner and said shell section openings.

30. A fuel tank system for use on aircraft and the like, comprising:
a plurality of elongated shell sections which, when assembled in proper edgewise orientation, form a shell for a fuel tank, and joint means for securing the shell sections in assembled condition;
fuel management means housed within the fuel tank shell and including an elongated flexible liner encapsulating a plurality of longitudinally spaced bulkheads therewithin, the bulkheads partitioning the liner into a plurality of fuel-receiving compartments and adapted for transferring fuel between said compartments; and
resilient connection means operatively associated between the bulkhead and the fuel tank shell for interconnecting the liner with the fuel tank shell.

31. The fuel tank system of claim 30 in which the bulkheads have a fuel conveying conduit for transferring fuel between the top of one side of the bulkhead and the bottom of the other side of the bulkhead.

32. The fuel tank system of claim 31 in which fuel conveying conduits extend between the bulkheads for transferring fuel between spaced apart fuel-receiving compartments in the fuel tank.

33. The fuel tank system of claim 30 in which the flexible liner is bonded to the bulkheads prior to field assembly of the fuel tank.

34. The fuel tank system of claim 30 in which the fuel management means includes a shut-off valve for prohibiting the introduction of fuel into said liner when the fuel level in each of the compartments reaches a predetermined level.

35. The fuel tank system of claim 30 having a forward bulkhead and a center bulkhead for partitioning the flexible liner into three fuel-receiving compartments.

* * * * *